June 10, 1924.

H. C. BREHMER

VALVE

Filed April 7, 1922

1,497,063

INVENTOR
*Herman Christian Brehmer.*

BY
*ATTORNEY*

Patented June 10, 1924.

1,497,063

UNITED STATES PATENT OFFICE.

HERMAN CHRISTIAN BREHMER, OF PHILADELPHIA, PENNSYLVANIA, ASSIGNOR TO H. W. BUTTERWORTH & SONS COMPANY, A CORPORATION OF PENNSYLVANIA.

VALVE.

Application filed April 7, 1922. Serial No. 550,547.

*To all whom it may concern:*

Be it known that I, HERMAN CHRISTIAN BREHMER, a citizen of the United States, and resident of Philadelphia, county of Philadelphia, and State of Pennsylvania, have invented an Improvement in Valves, of which the following is a specification.

The object of my invention is to provide a combined pressure and vacuum valve adapted for use with drying cylinders for textile apparatus, or paper making machinery or other purposes, wherein it is desired to prevent an objectionable vacuum or an excessive pressure in a steam heated chamber (usually in the form of a rotary drying cylinder), and the special object of my invention is to so combine the vacuum and pressure valves and their controlling springs as to provide a relatively short and compact mechanism occupying a relatively small space.

With the above and other objects in view, the nature of which will be more fully understood from the description hereinafter, the invention consists in the novel construction of valves, as hereinafter more fully described and defined in the claims.

Figure 1:
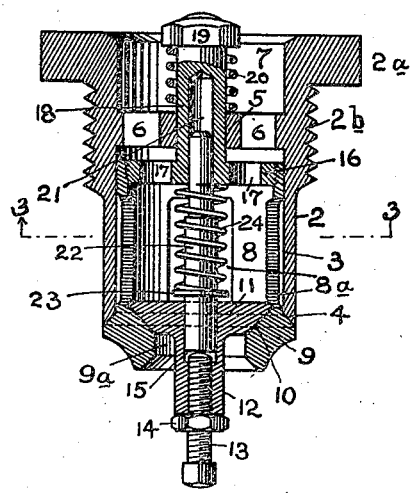
Figure 3:
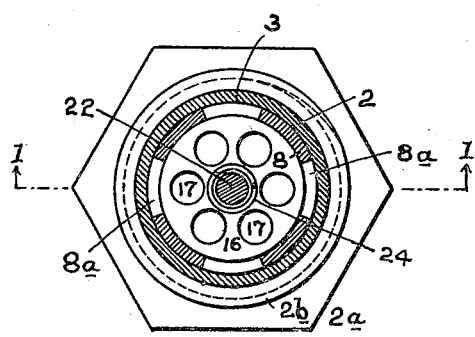
Figure 4:
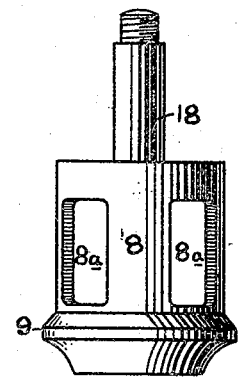
Figure 2:
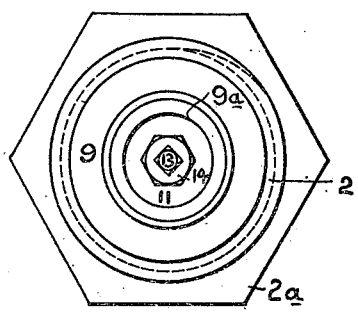

Referring to the drawings: Fig. 1 is a longitudinal sectional view through a valve mechanism embodying my invention, said section taken on the line 1—1 of Fig. 3; Fig. 2 is an end view of the valve mechanism; Fig. 3 is a transverse sectional view taken on line 3—3 of Fig. 1; and Fig. 4 is an elevation of the vacuum valve removed from the casing.

2 is the body or casing and consists of a cylindrical part adapted for attachment in any suitable manner to the cylinder or chamber with which it is to be employed. In the particular illustration, this body portion is provided with a hexagonal flange 2ª and a screw threaded portion 2ᵇ by which it may be screwed into position. At the inner end of the body 2 is provided a conical valve seat 4 and near the other end is a transverse diaphragm 5 having apertures 6 for free passage of air or steam. 9 is the vacuum valve and seats upon the valve seat 4 of the body 2, said vacuum valve being provided with a cylindrical extension 8 sliding within the inner surface 3 of the body 2, and said cylindrical extension 8 having openings or ports 8ª therein, said ports extending close to the valve portion 9. The end of the tubular extension 8, most distant from the valve proper 9, is closed by a disk shaped head 16 screwed therein and provided with apertures 17 for passage of steam and air, said head 16 provided with a central stem 18 sliding through the diaphragm 5 and having at its free end a nut 19. Surrounding the stem 18 and arranged between the diaphragm 5 and the nut 19 is a helical spring 20 whose action is to normally cause the valve 9 to seat upon the valve seat 4. The valve portion 9 is further provided with a port opening 9ª through its center and which is continued on the inside of the valve in a conical valve seat 10. Seated upon the conical valve seat 10 is an auxiliary or pressure valve 11, which opens outwardly or in the opposite direction to the opening movement of the vacuum valve 9. Loosely fitted in a hole 15 in the outer end of the pressure valve 11, is a stem 22 whose outer end slidably fits a hole 21 formed in the stem 18 of the vacuum valve. This stem 22 is provided with a flange or collar 23, which is normally at a slight distance from the pressure valve 11. Surrounding the stem 22 is a helical spring 24, one end of which presses upon the collar or flange 23 and the other end upon the inner surface of the head 16. The outer surface of the pressure valve 11 is extended in a hub 12 which projects through the opening 9ª in the vacuum valve 9 and said hub is provided with an adjusting screw 13 which may be locked in adjusted position by a lock nut 14. The inner end of the screw 13 presses upon the stem 22 and, by adjustment, may put any amount of compression upon the spring 24 that may be desired, and said spring acting through the stem 22 and the screw 13 forces the pressure valve 11 upon its seat 10 with the elastic pressure desired. It will be observed that, as this spring 24 is carried within the vacuum valve structure and moves with it bodily, there is no action by this spring 24 upon the vacuum valve, so that the vacuum valve operates the same as if the pressure valve 11 did not exist. Similarly, the spring 20 is supported by the body 2 and coacts with the extension of the vacuum valve and has no action whatever upon the pressure valve 11. Each of the springs 20 and 24, therefore, performs its own individual function upon the vacuum valve and the pressure valve respectively. There is no reason for requiring adjustment for the vacuum valve spring 20, as its only function is to maintain the vacuum valve closed with as little expenditure of force as is necessary, whereas in the case of the pressure valve, the spring 24 thereof should have capacity for adjustment to enable the maximum pressure within the drying cylinder to be predetermined and not to be exceeded, so that abnormal conditions could not accumulate a pressure which would be injurious to the cylinder itself.

In operation, when a vacuum is produced within the cylinder by rapid condensation of steam, the vacuum valve 9 is sucked away from the seat 4 and permits air to enter through the ports 6 in the body, thence through port 7 in the head 16 of the valve and into the interior thereof, said air then passing through the lateral ports 8ª and through the opening between the vacuum valve 9 and its seat 4. In case of an excess pressure within the cylinder, the steam forces the pressure relief valve 11 inward from its seat 10 on the inside of the vacuum valve 9, permitting the steam to pass into the cylindrical portion of the vacuum valve and thence outwardly through the ports 7 and 6 to the atmosphere, the extent of the pressure required to perform this function being controlled by the adjustment of the spring 24.

An important feature of this invention resides in the fact that the parts are so constructed that they properly coact to permit one to be guided upon the other with the shortest possible length to the valve as a whole. As will be seen, the parts are arranged so that both of the valve seats are in substantially the same transverse plane and the valve pieces made to co-act one with the other and movable in opposite directions in respect to their seats, so that the total length of the valve structure is made as short as possible consistent with proper guidance of the valve pieces. It will also be seen that the construction is such, that one of the valve pieces moves alone in one direction, but both of the valve pieces move simultaneously in the other direction, according as to which of the valve pieces is required to leave its seat; thus if the pressure valve piece 11 is required to open, it will move away from its valve seat 10 on the inside of the valve piece 9 without disturbing the latter in its relation to its own valve seat 4, but if the vacuum valve piece 9 is required to be moved to relieve the vacuum within the cylinder or other vessel, then and in that event, when the valve piece 9 moves away from its seat 4, the valve piece 11 also moves with it and maintains its relation with its own seat 10 formed on the inside of said vacuum valve piece 9. I have assumed that the valve piece 9 is to operate under the vacuum while the valve piece is to operate under the pressure conditions, but this is only on the supposition that the flanged end 2ª of the body is the outer end of the valve structure, but it is manifest that the body may be attached to the vessel in the reverse direction, if so desired, and in that event, valve piece 11 would constitute the vacuum valve and valve piece 9 would constitute the pressure valve, and I, therefore, do not limit myself as to which valve piece shall be employed as the vacuum valve and which shall be employed as the pressure valve.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent is:—

1. A combined pressure and vacuum valve, comprising a body part having a valve seat on its end, a main valve piece seating upon the valve seat of the body and adapted to open away from the body to provide an annular passage radially outward when the valve is open, said valve piece guided upon the body and having a projecting stem extending through a portion of the body part at its end furthest from the valve seat, a spring surrounding the stem for automatically closing the valve piece upon the valve seat of the body, an auxiliary valve piece arranged within the main valve piece and seating therein in a direction for opening in the reverse direction to the seating of the main valve piece upon the body and adapted to control the flow through the body in the reverse direction to that controlled by the main valve piece, a spring interposed between the two valve pieces for normally closing the auxiliary valve piece upon its seat in the main valve piece, a longitudinal movable member carried by the valve pieces for varying the tension of the spring, and adjusting means carried by said auxiliary valve piece for holding the member in adjustment.

2. The invention according to claim 1, wherein further, the longitudinal member consists of a part guided in the auxiliary valve piece and in the stem of the main valve piece and provided with an annular collar upon which the spring between the two valve pieces seats, and the means for maintaining the adjustment of the longitudinal part comprises a screw arranged in the end of the auxiliary valve piece.

3. In a combined pressure and vacuum valve, the combination of a tubular body having a valve seat, an annular valve piece guided in the body and seating upon the valve seat therein, a second valve piece seated upon the inside of the annular valve piece and also controlling the passage through the body, said valve pieces cooperating with their seats in opposite directions so that one of the valve pieces will be moved under a pressure above that of the atmosphere and the other valve piece will be moved by a pressure below that of the atmosphere, a spring for holding the annular valve piece yieldingly upon its seat on the body, a separate spring for yieldingly holding the second valve piece upon its seat on the annular valve piece, said springs operating in opposite directions, means provided for adjusting the tension of the spring operating upon the second valve piece for maintaining the two valve pieces yieldingly in contact, comprising a stem guided in both of the valve pieces and adjustable for putting the spring which acts upon the second valve piece under tension, and means carried by the second valve piece for adjusting the stem, whereby its tension may be varied to control the extent of yielding resistance against the opening of the second valve piece.

4. In a combined vacuum and pressure valve, the combination of a tubular body valve, having a transverse perforated diaphragm and a valve seat at one end, with an annular valve piece seating upon the valve seat and having a cylindrical cage slidingly fitted upon the interior wall of the tubular body and a central extension through the transverse diaphragm of the body, a spring surrounding the extension and resting upon the transverse diaphragm for yieldingly maintaining the valve piece in seated relation with the seat on the body part, a second valve seated on the inside of the annular valve piece, a vertical stem adjustable upon both valve pieces and provided with a collar, a spring surrounding the stem and resting at one end upon the collar and at the other end upon the first mentioned valve piece, whereby the second valve piece is spring pressed upon the annular valve piece, and an adjusting screw carried by the second valve piece for adjusting the stem longitudinally to vary the tension of the spring carried thereby.

In testimony of which invention, I hereunto set my hand.

HERMAN CHRISTIAN BREHMER.